United States Patent
Beech

(10) Patent No.: US 11,952,035 B2
(45) Date of Patent: Apr. 9, 2024

(54) STEERING MECHANISM AND SYSTEM FOR BACKING A TRAILER

(71) Applicant: Geoffrey S Beech, Madison, AL (US)

(72) Inventor: Geoffrey S Beech, Madison, AL (US)

(*) Notice: Subject to any disclaimer, the term of this patent is extended or adjusted under 35 U.S.C. 154(b) by 586 days.

(21) Appl. No.: 17/181,054

(22) Filed: Feb. 22, 2021

(65) Prior Publication Data

US 2021/0171098 A1    Jun. 10, 2021

Related U.S. Application Data

(63) Continuation-in-part of application No. 15/839,794, filed on Dec. 12, 2017, now Pat. No. 10,926,796, which is a continuation-in-part of application No. 14/686,744, filed on Apr. 14, 2015, now Pat. No. 9,840,277, which is a continuation-in-part of application No. 13/628,261, filed on Sep. 27, 2012, now Pat. No. 9,004,519.

(60) Provisional application No. 61/626,961, filed on Sep. 28, 2011.

(51) Int. Cl.
*B62D 13/02* (2006.01)
*B60D 1/62* (2006.01)

(52) U.S. Cl.
CPC ............ *B62D 13/025* (2013.01); *B60D 1/62* (2013.01)

(58) Field of Classification Search
CPC ................................ B62D 12/025; B60D 1/62
See application file for complete search history.

(56) References Cited

U.S. PATENT DOCUMENTS

| | | | | |
|---|---|---|---|---|
| 6,176,504 B1* | 1/2001 | Van Mill | ................. | B60D 1/62 |
| | | | | 280/444 |
| 6,273,446 B1* | 8/2001 | Paul | ..................... | B62D 13/06 |
| | | | | 280/446.1 |
| 8,061,489 B1* | 11/2011 | Lavens | ................... | B60T 7/102 |
| | | | | 188/112 R |
| 9,004,519 B1* | 4/2015 | Beech | .................... | B62D 13/06 |
| | | | | 280/442 |
| 9,016,711 B1* | 4/2015 | Mathews | ............... | B62D 13/04 |
| | | | | 280/492 |
| 9,650,071 B2* | 5/2017 | Manion | .................... | B62D 7/20 |
| 9,795,073 B2* | 10/2017 | Scherman | ............. | A01B 69/003 |
| 9,828,051 B2* | 11/2017 | Gray | ...................... | B62D 13/04 |
| 11,370,490 B2* | 6/2022 | Sypitkowski | ...... | B62D 15/0275 |
| 11,407,264 B2* | 8/2022 | Jaeger | ...................... | B60D 1/01 |
| 2010/0052289 A1* | 3/2010 | Frey | ........................ | B60G 3/14 |
| | | | | 280/442 |
| 2022/0258799 A1* | 8/2022 | Martel | ................... | B62D 12/00 |

* cited by examiner

*Primary Examiner* — Tony H Winner
(74) *Attorney, Agent, or Firm* — Briggs IP; Jeremy A. Briggs

(57) ABSTRACT

A controlled steering system includes a sliding carriage attached to the steering at least one steering rod. As the carriage slides from one side of the horizontal pivot pint of the towbar, the direction off steering with respect to the towbar reverses. Also, the distance of the sliding carriage from the horizontal pivot point controls the degree of steering. By controlling the movement of the sliding carriage in response to measurements of towbar angle, the backing process can be partially or completely automated.

11 Claims, 10 Drawing Sheets

STEERING MECHANISM AND SYSTEM FOR BACKING A TRAILER

CROSS REFERENCE TO RELATED APPLICATIONS

This application is a divisional of U.S. patent application Ser. No. 15/839,794 filed Dec. 12, 2017, which is a continuation-in-part of U.S. Ser. No. 14/686,744 filed Apr. 14, 2015, which is a continuation-in-part of U.S. Ser. No. 13/628,261 filed Sep. 27, 2012, now U.S. Pat. No. 9,004,519. U.S. Ser. No. 13/628,261 claims the benefit of U.S. provisional application No. 61/626,961 filed Sep. 28, 2011. The applications and patent listed above are incorporated herein by reference in their entirety.

STATEMENT REGARDING FEDERALLY FUNDED DEVELOPMENT

This invention was not made with any Federal or State government support.

FIELD OF THE INVENTION

This application relates to steering systems for trailers that use a towbar that pivots horizontally about a pivot point for steering wheels of the trailer via one or more steering rods, and particularly to steering systems such that, when backing a trailer, the steered wheels are moved oppositely with respect to lateral movement of the towbar.

BACKGROUND OF THE INVENTION

Steerable trailers or wagons are characterized by a tow bar (tongue) connection between a trailer and a hitch on a tow vehicle. The tow bar usually comprises a first horizontal pivot and a first vertical pivot at the hitch and a second vertical pivot and second horizontal pivot at the front of the trailer chassis. The vertical pivots decouple the vertical trailer loads on the rear suspension of the tow vehicle and provide for improved handling by eliminating trailer weight on the hitch. The horizontal pivots at the hitch and front of the trailer chassis allow steering of the front wheels of the trailer via steering rods attached between the front wheels and the towbar such that horizontal displacement of the towbar steers the wheels. This configuration, however, causes steering of the trailer to be difficult when backing up. This difficulty during a backing operation involving two horizontal pivots has been compared to "pushing a rope".

BRIEF SUMMARY OF THE INVENTION

The present disclosure includes and improves upon existing methods and apparatus for backing a trailer by providing methods, apparatus, and systems for automated backing of a wagon or trailer with steered wheels on the front axle. The methods, apparatus, and systems allow for manufacture of partially or fully automatically steered front axle wagon archetypes, and for retrofitting existing wagons or trailers to be partially or fully automatically steered.

The present invention involves steering systems that, when backing a trailer, the steered wheels are moved oppositely with respect to lateral movement of the towbar by steering rods that are mounted to a sliding carriage on the towbar. The carriage moves the steering rods forward or backward with respect to a pivot point such that the steering direction relative to the horizontal angle of the towbar is reversed as the steering rods pass from proximity of one side of the pivot point to the other. Automated steering control involves sensors providing feedback that may include the angle of the towbar with respect to the trailer chassis and relative turning velocities of trailer wheels.

BRIEF DESCRIPTION OF THE DRAWINGS

The elements of the drawings are not necessarily to scale relative to each other, usually in order to enhance clarity, with emphasis placed instead upon clearly illustrating the principles of the disclosure. Like reference numerals designate corresponding parts throughout the several views of the drawings in which.

DETAILED DESCRIPTION OF THE INVENTION

The terms "wagon" and "trailer" are used interchangeably with their commonly understood meanings in the context of a towed vehicle comprising a towbar/tongue. The term "microcontroller" is used to indicate a microprocessor or computer used to control a process such as the steering of a trailer, including controllable components.

Figure 1:
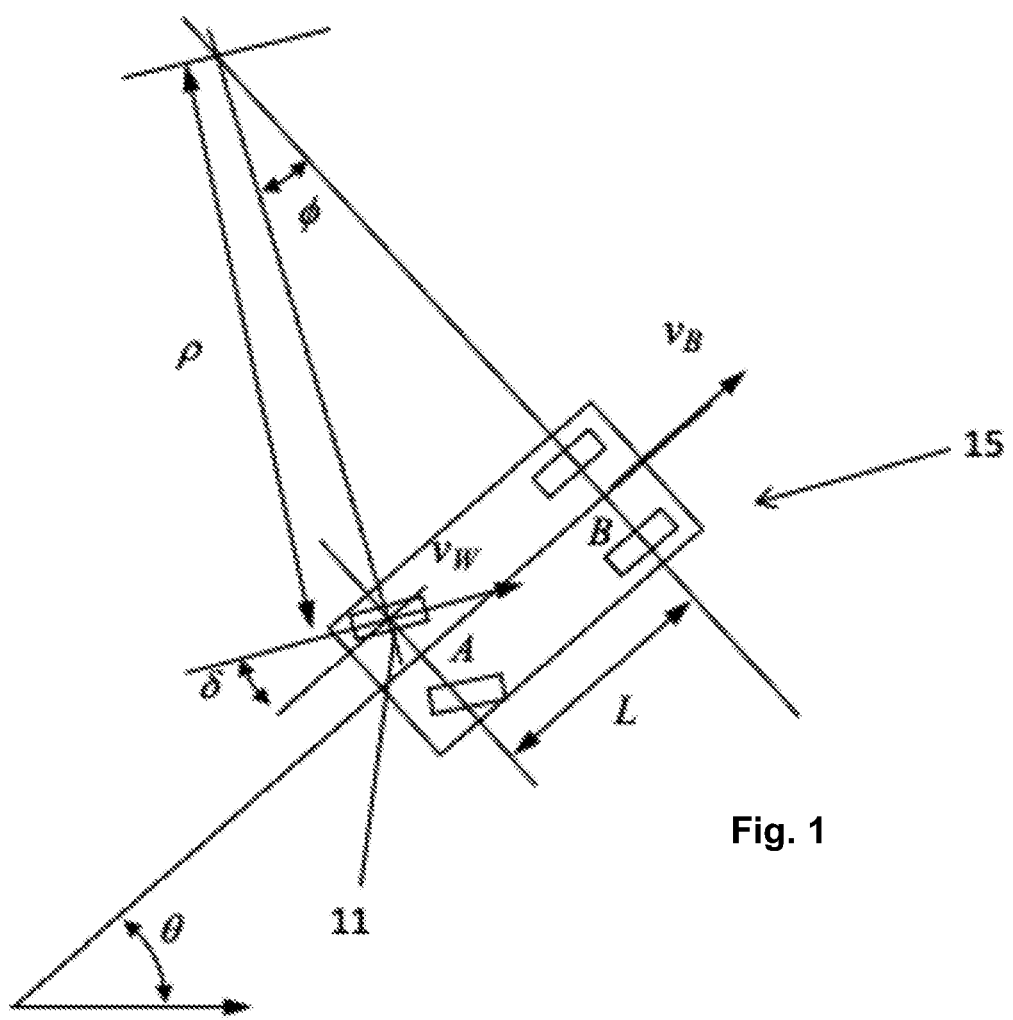
FIG. 1 is a diagram with terminology and concepts for describing of a steered wheel trailer.

FIG. 1 is a diagram illustrating terminology and concepts useful for a description of methods and apparatus related to steering control for a steered wheel trailer. For the sake of familiarity, the vehicle 15 shown may be thought of as an automobile backing up in the direction of the arrow running from A to B. The same principles apply if the vehicle 15 is a forward moving forklift with rear wheel steering or a steered wheel trailer or wagon being pushed by a tow vehicle that is backing up. The yaw rotation rate $\theta_w$ of the vehicle 15, that is the rate at which the yaw of the vehicle is changing, is proportional to the velocity of steered wheel 11 $v_w$ and the sine of steering angle, $\delta$, and inversely proportional to the wheel base L measured between front to rear axles A and B. The distance from the measured wheel to the instantaneous center of rotation of the chassis is indicated by p. Combining these with the geometry of the diagram leads to a formula that is useful for controlling the steering of a backing wagon or trailer:

$$\theta_w = v_w/\rho = v_w \sin \phi / L \quad \text{(Eq. 1).}$$

Figure 2:
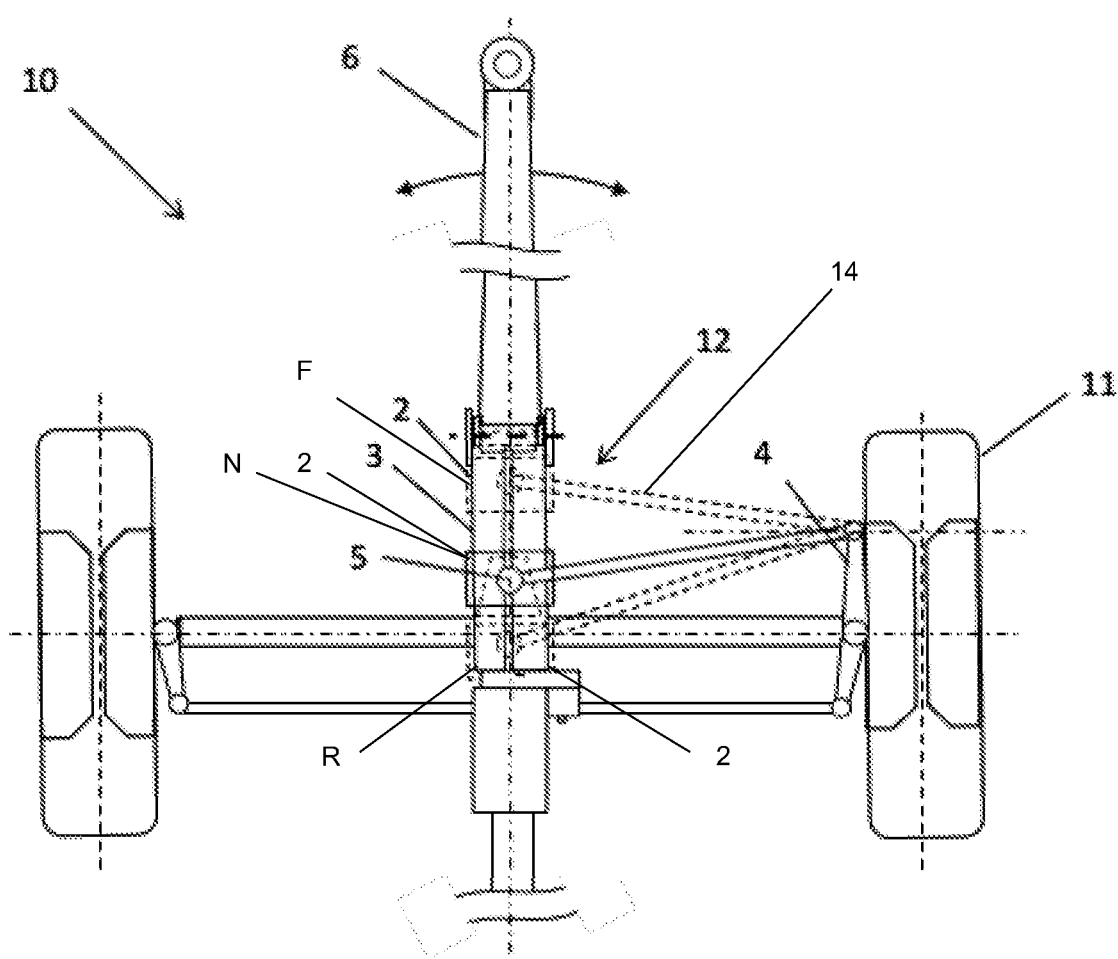
FIG. 2 is a top view of a first embodiment of a wagon comprising a steering mechanism.
Figure 3:
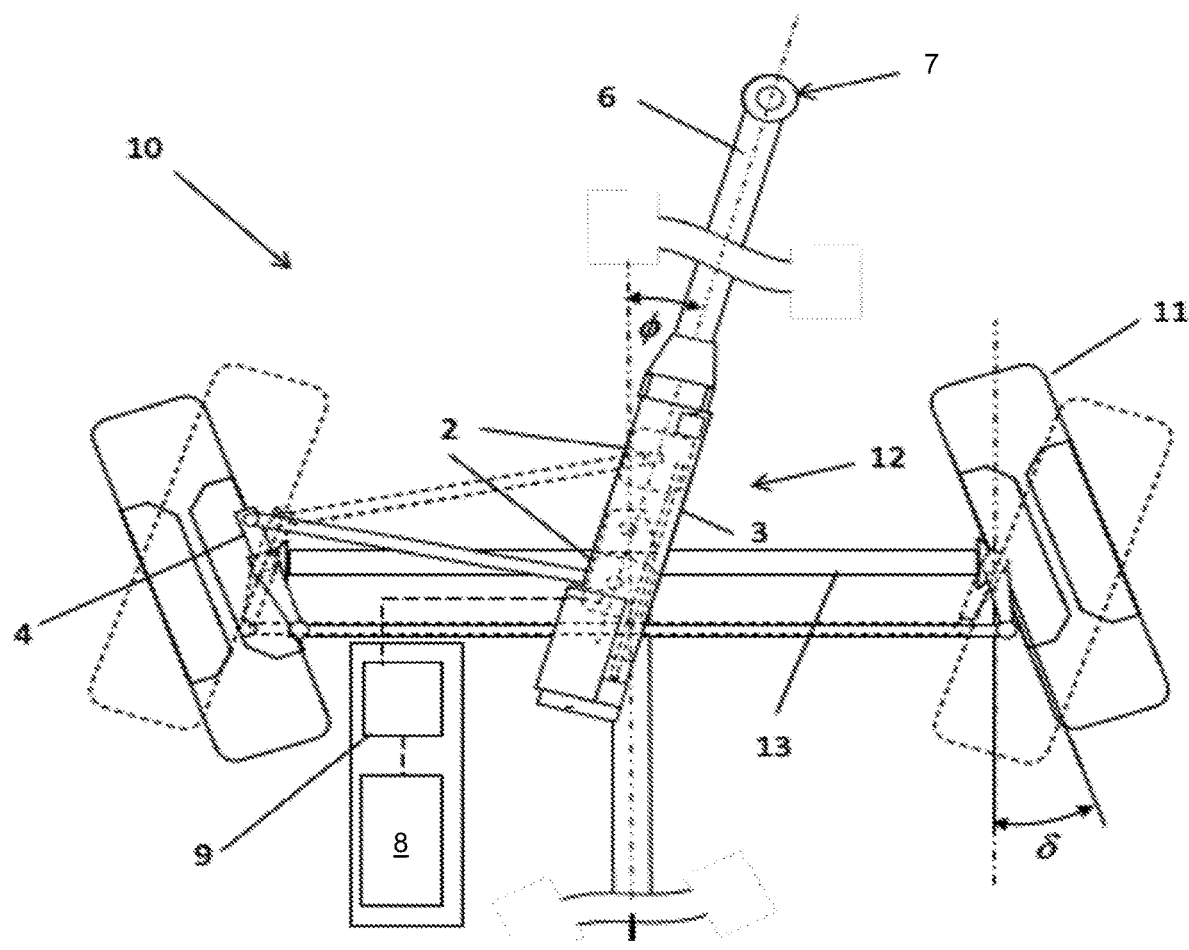
FIG. 3 is a top view of a first embodiment of a wagon comprising a steering mechanism.

FIGS. 2 and 3 are top views of a first embodiment of a trailer or wagon 10 comprising a towbar 6 with a horizontal pivot point 5 and equipped with a steering control mechanism 12. The steering control mechanism 12 comprises a carriage 2 that is axially movable in or on a carriage slide 3 in or on the tow bar 6. Three of the many possible positions for carriage 2 are shown: a neutral position N (solid lines), a forward position F (dashed lines), and a rear position R (dashed lines). A steering rod 14 is connected to a steerable wheel 11 at a lateral end and to the carriage 2 at a medial end. When the carriage 2 is positioned such that the medial end of the steering rod 14 is vertically aligned with the horizontal pivot point 5 at the N position, moving the towbar horizontally has no steering effect on the wheels 11. When the carriage 2 is positioned forward of the horizontal pivot point 5, e.g. at the F position, horizontal movement of the towbar causes the wheels 11 to be steered in the same direction as the end of the towbar 6 as shown in FIG. 3. When the carriage 2 is positioned rearward with respect to the horizontal pivot point 5, e.g. at the R position, horizontal movement of the towbar causes the wheels 11 to be steered in the opposite direction from the end of the towbar 6 (FIG. 3). As carriage 2 moves further from the horizontal pivot point 5, the steering response of the control system is increased, as steering leverage is increased relative to the length of the steering arm 4 (FIG. 2).

Referring to FIG. 3, the steering angle, $\delta$, of wagon 10 is proportional to tow bar angle $\phi$ relative to the wagon chassis with $\delta = G^*\phi$, where G is a controlled input between 1 and −1, representing position of carriage 2 on slide 3 relative to the horizontal pivot axis 5, with associated steering leverage provided by the tow bar rotation and relative distance between the carriage 2 and the horizontal pivot 5 relative to steering arm 4 length. When the carriage 2 is forward of the horizontal pivot axis 5 by a distance equal to the length of steering arm 4, G is equal to 1. G is equal to 0 when located over pivot axis of the tow bar, as there is exactly no steering leverage as tow bar 1 is rotated, and G is equal to −1 when the carriage is behind the horizontal pivot axis 5 at a distance equal to the length of steering arm 4. If the steering center is perpendicular to wagon chassis 1, front to back, divergent hitch motion from the steering center warrants forward motion of carriage 2, whereas convergent hitch motion from the steering center warrants movement aft or rear of carriage 2, behind pivot 5.

In the unique towing configuration when the steered wheels 11 are aligned in the forward direction and the carriage 2 is in the N position, the steered wheels 11 track straight forward when pulled straight forward and track straight backward when the trailer is pushed straight backward independent of the towbar angle. To affect automatic steering while backing and as towbar 6 is moved left or right of center, carriage 2 is automatically moved forward and aft of the N position by a steering control system in accordance with a steering control logic executed by a steering control software or program.

The steering control system comprises a microcontroller 9 with control software operationally coupled to and controlling a steering control mechanism 12 (FIG. 3). The steering control mechanism 12 comprises an actuator 58 for moving the carriage 2 in response to signals from the microcontroller 9. The actuator 58 and and/or the microcontroller may be powered by a battery or other power storage device 8 or by power from a tow vehicle connected to the trailer 10. The microcontroller 9 may be any suitable computing device capable of receiving the required input, executing software, and controlling the actuator 58. Examples of a suitable microcontroller include a PIO controller such as a programmable ARDUINO® MEGA® computing platform available from Arduino®, and motor controllers such as a SYREN 50® available from Dimension Engineering, Inc. Programming of the ARDUINO® board, for example, is accomplished by connecting a personal computer to the board and uploading programs via an ARDUINO® interface. These and similar microcontrollers are also applicable to more advanced control systems comprising video, optical, infrared, magnetic Hall-effect, and ultrasonic sensors, which may be used to improve real-time characterization of tow-vehicle path, tow bar angle and rotation rate, and for collision avoidance and lane-drifting indication.

The steering control system comprises one or more sensors 75, 77, 95, 97 for gathering information such as towbar angle, wheel speed, carriage position, and geographical location of the trailer. Examples of encoding sensors 77 may include counting registers, relative NB encoders and absolute encoders. Positional sensors 75 may include rotation and position sensors such as mechanical limit switches, optical switches, and Hall-effect proximal sensors. Additional circuitry may include signal and power filters to ensure proper operation, along with shielding of analog higher power cables and other automotive workmanship standards.

Additionally or alternatively, to positional and encoding sensors 75, 77, the sensors may include one or more of visual, optical, or laser range finders 95 and sonar sensors 97 to provide continuous feedback on the relative positions and angles of one or more of the trailer chassis 13, the towbar 6, the hitch 7, the steered wheel(s) 11, and the tow vehicle. The visual, optical, or laser range finders 95 and sonar sensors 97 are positioned on the front axle A of the chassis 13 of an axle assembly 94 in FIG. 8 but these sensors may individually or collectively be located at other positions on the chassis 13 of a trailer 10, on the towbar 6 or the towing vehicle in accordance with the distance(s) and or angle(s) being measured and the configuration of the paired trailer and towing vehicle.

A feedback control component of the steering software is preferably stored in the microcontroller 9 on the chassis 13 or body or frame of the trailer but may be housed on a separate microprocessor or computer communicating with the microcontroller 9. The microcontroller receives information in the form of sensor data from the sensors 75, 77, 95, 97 and controls the actuator 58 that moves the carriage 2 according to calculations performed by the microcontroller 9. Alternatively, the steering system may comprise a first microprocessor located on the towing vehicle and a second microprocessor located on the trailer 10 with the second microprocessor acting as a microcontroller for controlling the actuator 58 and the first microprocessor collecting information from sensors, performing calculations, and sending instructions to the second microprocessor.

The steering control system may employ existing left and right-hand turn signals as command input to the microprocessor 9 for amplified or attenuated steering response, for backing or towing around corners. The steering control system may further enhance performance by using video imagery guidance to determine relative road and curb locations to provide further guidance to the steering system control system.

To maintain stable control when backing, carriage 2 is adjusted relative to the horizontal pivot point 5 to develop sufficient steering leverage on towbar 6 for stable control of autonomous steering. When the towbar angle is changing during backing, as when backing a wagon around an arc and making corrections, carriage 2 is constantly changing as corrections change the towbar angle. When backing the trailer around an arc without making corrections, carriage 2 is initially positioned to correspond to the arc and held steady to correspond to the unchanging towbar angle. To an operator, manually steering the tow vehicle while backing is similar to backing with no wagon attached because the automatic steering system automatically steers the wagon along a common trajectory.

The trailer 10 shown in FIGS. 2 and 3 comprises a drag link connecting steering arm 4 of wheel 11. It should be apparent that the steering mechanism 12 is equally applicable to other types of steered wheel trailers, for example comprising two steering arms, with similar results.

Figure 4:
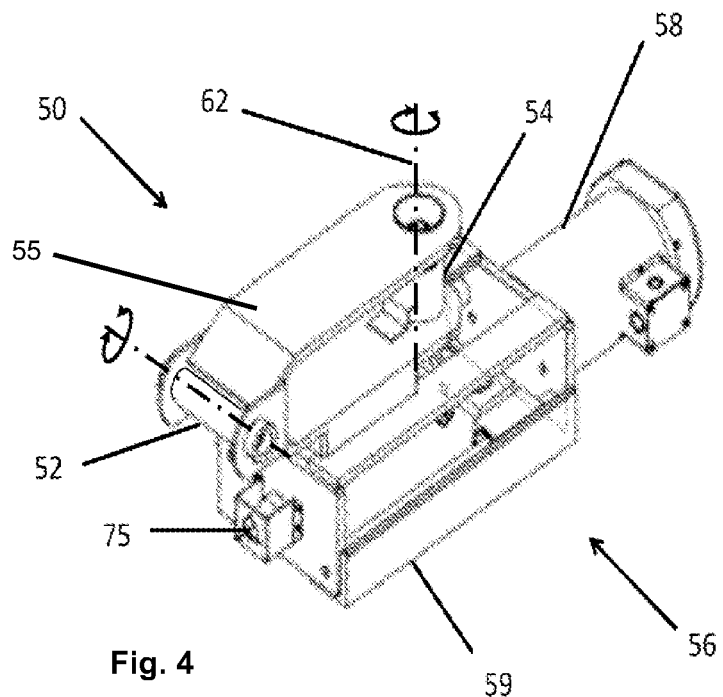
FIG. 4 is a perspective view of a bracket and steering mechanism assembly.
Figure 5:
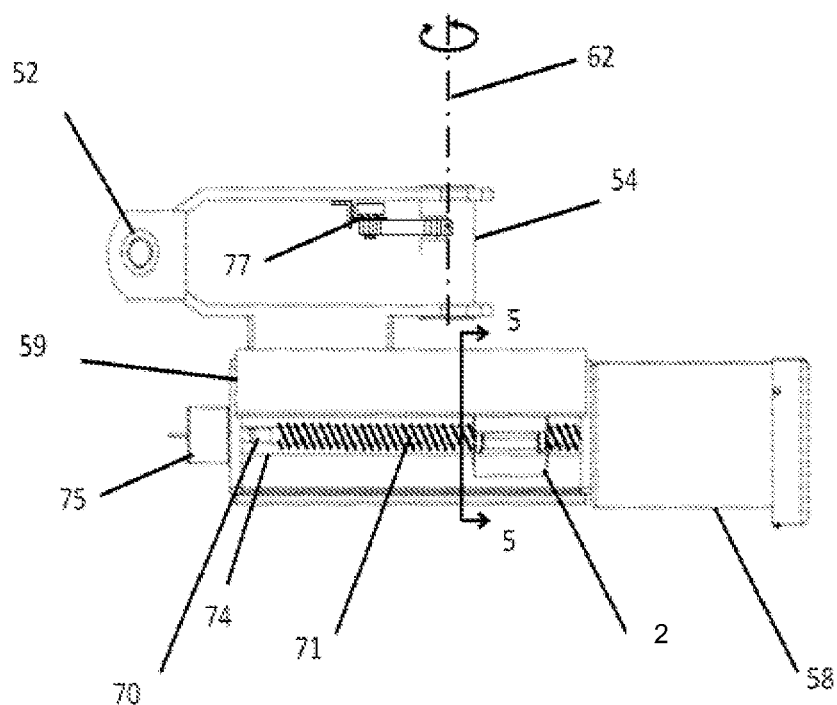
FIG. 5 is a side cross section view of a bracket and steering mechanism assembly.

A steering system comprising the steering mechanism 12 may be incorporated into a trailer during manufacture or a conventional steered wheel trailer may be retrofitted to comprise the steering mechanism 12 as part of a steering system. FIGS. 4 and 5 are perspective and side cross sectional views of one embodiment of a bracket and steering mechanism assembly 50 that can replace conventional bracket types connecting steered wheel trailers to their respective towbars during manufacture or after manufacture to convert or retrofit a conventionally steered trailer or wagon. The bracket 55 comprises a horizontal clevis pin or tube 52 that is configured to be fitted into a towbar clevis for vertical pivoting of the towbar and a vertical clevis pin or tube 54 that is configured to be fitted into a towbar clevis for horizontal pivoting of the towbar. In this embodiment, a steering control mechanism assembly 56 is mounted to and below the bracket portion. The steering control mechanism assembly 56 comprises a control actuator 58, which may be an electric motor, such as a stepper motor or a servo motor, or a linear actuator that may be manually, electrically, hydraulically or pneumatically powered. Where an electric motor is used, a gear reduction set may be incorporated with the motor for additional mechanical advantage. A robust structural enclosure 59 houses internal components of the steering control assembly 56. The actuator 58 is functionally connected to move a carriage 2 within the enclosure 59 to any position to one side or another of the axis 62 of vertical pivot pin or tube 54.

Figure 7:
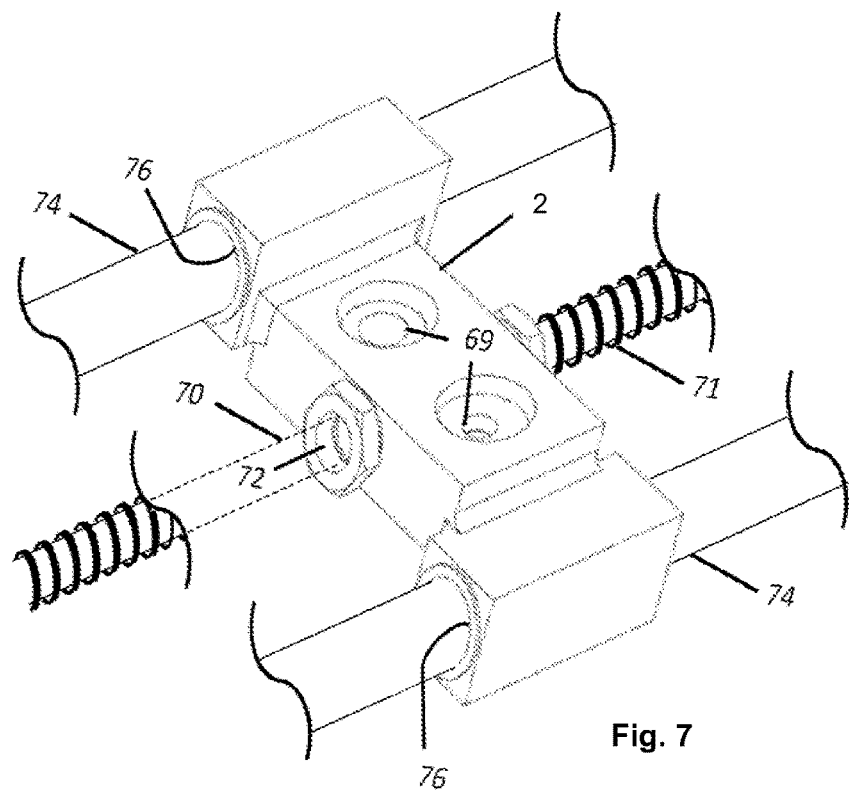
FIG. 7 is a perspective view showing details of the carriage assembly shown in FIG. 6.

For embodiments comprising an electric motor actuator 58, such as a geared servomotor shown in FIG. 5, the gear motor shaft may be connected to a lead screw 70. Threads 71 on the lead screw engage threads 72 incorporated in carriage 2 to drive carriage 2 to any position on the lead screw. The lead screw is supported at each end in enclosure 59 by appropriate structural bearings. In addition to the lead screw, carriage 2 is further supported in sliding relation by structural members, such as rods 74 (FIGS. 5 and 7) that are, in turn, supported at each end at the end walls of enclosure 59. Rods 74 extend through openings 76 of the carriage 2 to allow the carriage to slide along rods 74 when motor 58 rotates lead screw 70. Appropriate bearing materials are used between the rods and openings of carriage 2, preferably with appropriate lubricants on the rods and lead screw. The steering tie rods extend outward from enclosure 59 through a longitudinal slot corresponding to all possible positions of carriage 2 along lead screw 70. Flaps of a resilient material, brushes or a sliding window structure, may be used to cover the slots to generally prevent entry of water, dirt and other contaminants into the interior of enclosure 59. Since enclosure 59, carriage 2, rods 74, lead screw 70, and associated components must bear steering loads associated with towing and backing the wagon or trailer, they are preferably fabricated of hardened, robust materials, and sealed against harsh environmental conditions.

Figure 6:
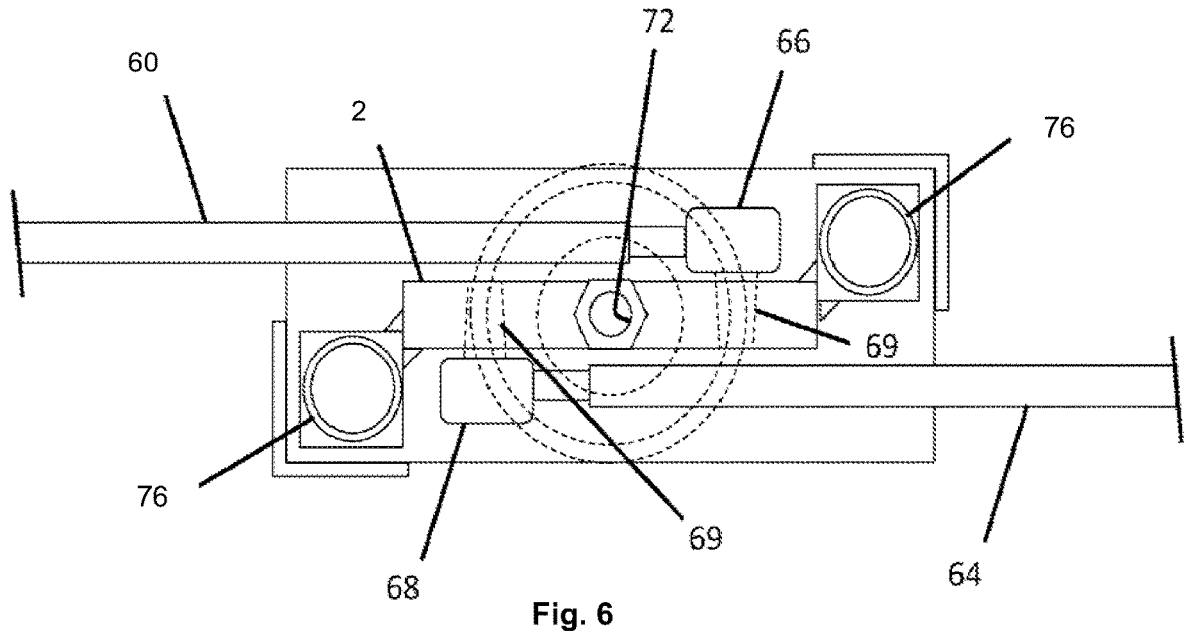
FIG. 6 is a cross sectional view diagram showing construction of the assembly in FIG. 4.

FIG. 6 shows steering tie rods 60, 64 connected to carriage 2 by knuckle joints 66, 68 respectively, that are connected to conical openings 69 in carriage 2 so that ends of the steering tie rods are moved with the carriage to any position on one side or the other of axis 62 (FIG. 4). The offset arrangement connecting the steering knuckles 66, 68 allows for a flat profile, which provides better ground clearance for embodiments of the steering mechanism 12 positioned beneath the towbar 6, and maintains an Ackerman steering geometry.

The embodiment shown in FIG. 5 comprises one or more sensors 75, 77 representative of simple feedback information for microprocessor 9. The sensors sense at least and position or location of carriage 2 and one or more of the towbar angle or the rate of change of the towbar angle with respect to the trailer chassis 13 or stationary front axle. Rate of change is used, for example, when PIO-type controllers are used to control steering. Here, carriage position sensor 75, which may be a shaft encoder or any other appropriate encoder, is mounted to sense rotation and rotation angles of lead screw 70.

The microcontroller 9 in this embodiment counts and tracks the of number and direction of rotations of the lead screw to keep track of location or position of carriage 2. Sensor 77, which may be another encoder such as an absolute encoder or any other appropriate encoder for providing angular information, has a body fixed on or near vertical pivot tube 54, with its shaft rotatably connected to a pin or the like fixed to the chassis 13 or front axle as by belts and pulleys, sprockets, drive chains or meshing gears. As the towbar is rotated about axis 62, encoder 77 provides a signal representative of towbar angle with respect to fixed front axle A or chassis of the trailer. Limit switches (not shown) may be provided at each end of travel of the carriage 2 within enclosure 59, with the one limit switch, for example, mounted to an inner wall of the distal end of enclosure 59 that supports bearing 73 and sensor 75. A second limit switch may be mounted, for example, to an inner wall of the proximal end of enclosure 59 that supports actuator 58. The first limit switch at the distal end of lead screw 70 may be activated by contact with the carriage 2, and prevents damage to the enclosure, lead screw and carriage by providing a signal that stops rotation of the lead screw to stop the carriage before it contacts the distal end wall of enclosure 59 or runs out of thread on the lead screw. The second limit switch at the proximal end of the lead screw near actuator 58 may also be activated by contact with the carriage, and similarly prevents damage to the carriage, lead screw and enclosure by providing a signal that stops rotation of the lead screw. The position of the first limit switch may be used to set a reference point for towing wherein the steered front wheels are steered directly with sideways towbar displacement. In other words, the carriage 2 is positioned at a towing position where the front wheels are steered to accurately track wheels of a tow vehicle while towing as determined by sideways towbar displacement after the carriage contacts the second limit switch.

A signal provided by this first limit switch may be used to reference sensor 75 to a reference position when the carriage contacts the first limit switch, and then activate servo motor 58 a predetermined number of turns of lead screw 74 to drive carriage 2 to the towing position. In other embodiments, the towing position may be the position of the carriage 2 when it activates the first limit switch. Where the carriage 2 is driven to a towing position a short distance away from the first limit switch after activating the first limit switch, power to motor 58 may be interrupted so that the wagon may be safely towed without any chance of the carriage being moved. Since it would be very difficult for steering loads to backdrive the lead screw to shift the position of carriage 2, no movement of the carriage would occur during towing with motor 58 deenergized. However, encoder 75 could still be used to monitor position of carriage 2, and reenergize motor 58 to correct the position of the carriage if necessary, or provide a signal to an operator that the carriage position has shifted and recalibration of the carriage position is necessary. In other embodiments, a positive lock, such as a solenoid-driven pin on the carriage driven through an opening in the enclosure, may be used to lock the carriage in place. This would also relieve steering stresses on the leadscrew and rods that the carriage rides along. Typically, the towing position of carriage 2 on lead screw 70 would be only a short distance from the distal wall of enclosure 59, such as an inch or so, in order to allow extreme backing corrections that may move the carriage past the towing position toward the distal wall of enclosure 59. In addition, positioning the carriage 2 at a towing position a short distance from the first limit switch eliminates excessive wear and tear on the limit switch.

Figure 8:
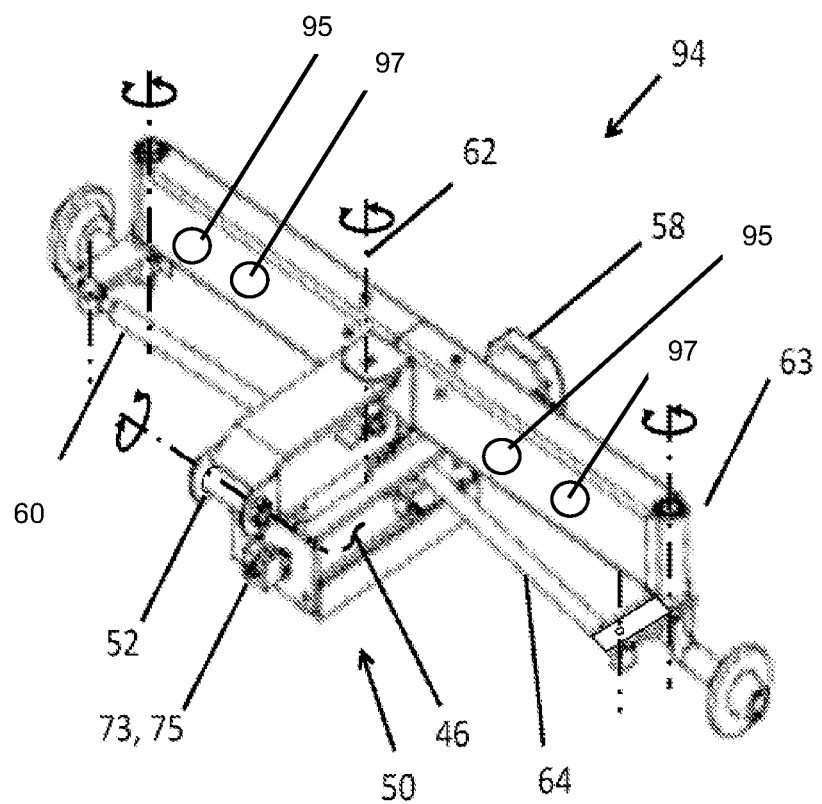
FIG. 8 is a perspective view of a front axle assembly for retrofitting a conventional steered wheel wagon or trailer.

One method for retrofitting a conventional steered wheel trailer to comprise a steering system and steering mechanism 12 comprises removing the front axle of the trailer and replacing it with an axle assembly 94 comprising a bracket and steering mechanism assembly 50 as shown in FIG. 8. The axle assembly 94 may be fixedly welded or attached by fasteners to the front chassis of trailer or wagon in the manner of a conventional trailer or wagon. Steering tie rods 66, 64 are mounted to knuckle joints on the carriage 2 to allow for movement of the steering tie rods as carriage 2 is moved.

Figure 9:
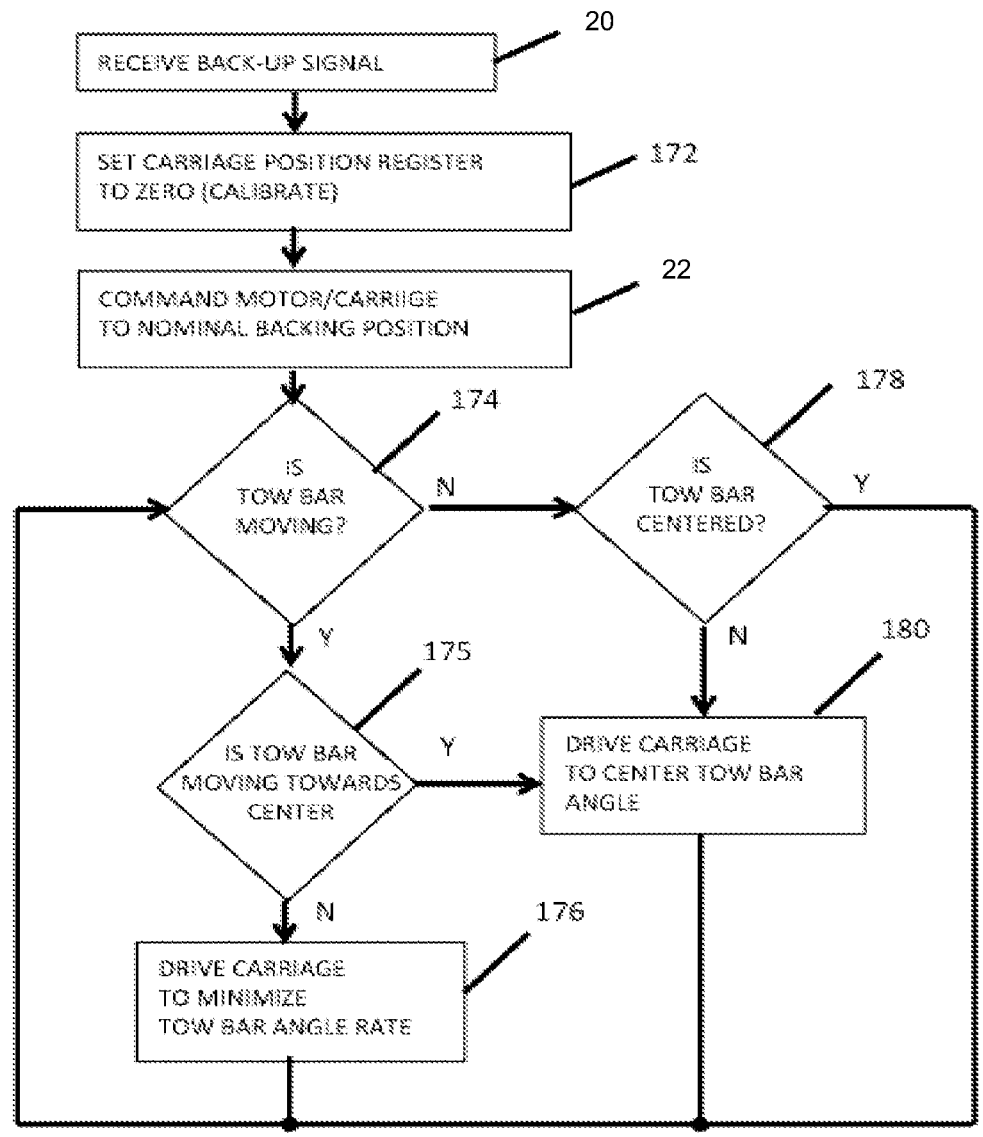
FIG. 9 is a flowchart illustrating a first embodiment of control logic for a general process of controlling a steering mechanism.

FIG. 9 is a flowchart illustrating a simple embodiment of control logic for a general process of controlling a steering mechanism 12. At box 20, the microprocessor/microcontroller 9 receives a signal from the tow vehicle that the tow vehicle is about to commence backing. The signal may be taken from a back-up light of the tow vehicle when the tow vehicle is put in reverse, or by other indications such as a radio command from the tow vehicle to a receiver on the wagon (not shown). When the back-up signal is received by the microcontroller 9, the microcontroller signals the actuator/motor 58 to drive carriage 2 to a calibration position at box 172. This sets a reference point from which the carriage position while backing may be referenced from, such as a binary count of 0, or any other convenient binary count from an encoder 75. Such a calibration may not be needed every time the wagon is backed and nonvolatile RAM may be used to store a last position of carriage 2 as determined, for example, by counting a number of turns a lead screw 70. After calibration at box 22, actuator/motor 58 is commanded to drive carriage 2 to a nominal backing position, which may be a null or neutral position where the medial end of the steering tie rod 14 at the carriage is above the horizontal pivot point 5 for the towbar, or a point near the pivot point of the towbar. As the tow vehicle commences to back the trailer, the query is posed at box 174 as to whether the towbar angle is changing. If the answer is YES, then the process flows to box 176 where the carriage is driven toward a position to reduce the change of the towbar angle. In other words, if the towbar angle is increasing, then the carriage 2 is driven to steer the wheels to minimize the rate increase.

The process loops back to box 174 until the carriage is at a position such that no change of towbar angle occurs, which backs the wagon in an arc determined by the tow vehicle backing along the same arc. When the tow vehicle changes direction, causing a change of towbar angle, then the answer at box 174 is NO, and the process flows to box 178 where the query is posed as to whether the towbar is centered for backing the wagon straight back. If the towbar is centered, then the answer is YES and the process flows back to box 174 and repeats. If the answer at box 178 is NO, then the carriage is moved toward centering the towbar at box 180 and the process loops back to repeat at box 178. This loop causes the trailer to be backed straight when the towbar is centered. The processes are usually occurring and repeating with a frequency of around 30 Hz so dithering of the carriage may occur around the optimal positions of the carriage for backing straight back and around an arc as minor backing corrections are made. Such dithering may cause small jerking motions of the carriage that may cause undue wear or other undesirable effects, so a controller for backing may use a proportional-integral differential (PIO) algorithm, or any combination thereof, to smooth the carriage motions and achieve a faster response.

Figure 10:
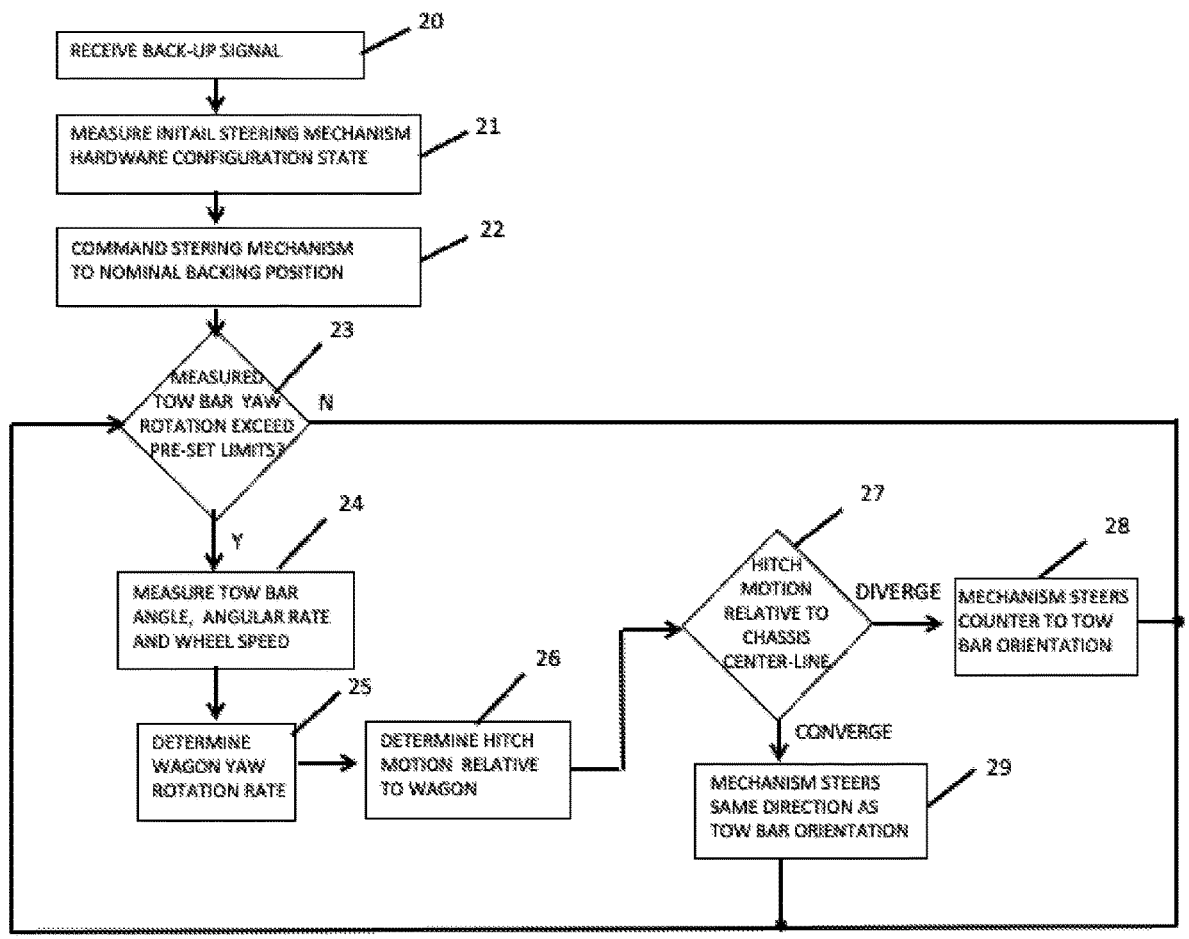
FIG. 10 is a flowchart illustrating a second embodiment of a control system logic for steering a steered-wheel type wagon while backing.

FIG. 10 shows one embodiment of a control system logic for steering a trailer while backing. Microcontroller 9 receives a backup signal 20 to initiate process steps for steering the trailer into the measured velocity path of the hitch 7 (FIG. 3) relative to wagon chassis 13. Microcontroller 9 receives information 21 on the current position of the carriage 2 and optionally other information such as towbar angle and wheel velocity. Microcontroller sends a command 22 to a motor N to move the carriage into position for backing. Tow bar 6 yaw, or rotation angle, is measured and compared to pre-set limits for rotation angle and angular rate 23. If tow bar rotation is within pre-set limits, steering mechanism actuation is inhibited. If tow bar 6 rotation exceeds preset limits, the steering control software determines the tow bar 6 angular position and rate in step 24 and, from that, wagon chassis 13 angular rotation rate in step 25 (e.g. using equation 1), enabling determination of relative motion of tow vehicle hitch 7 to wagon chassis 13 independent of wagon rotation in step 26.

Given a longitudinal line of symmetry N from front to back and tow bar 6 rotation relative to the line of symmetry, a yaw rotational rate φ of tow bar 6 about horizontal pivot 5 can be measured with a rotation sensor connected between tow bar 6 and wagon chassis 13. In this steering control system embodiment, step 27 determines if tow vehicle hitch 7 is converging or diverging from the line of symmetry N. If hitch 7 is converging toward the line of symmetry or diverging away from the line of symmetry, steering control system response in step 29 is to command the steering mechanism 12 to steer in the same direction as tow bar 6. If hitch 7 is diverging away from the line of symmetry, the steering control system response is to command steering mechanism 12 to steer in the opposite direction of tow bar 6.

Figure 11:
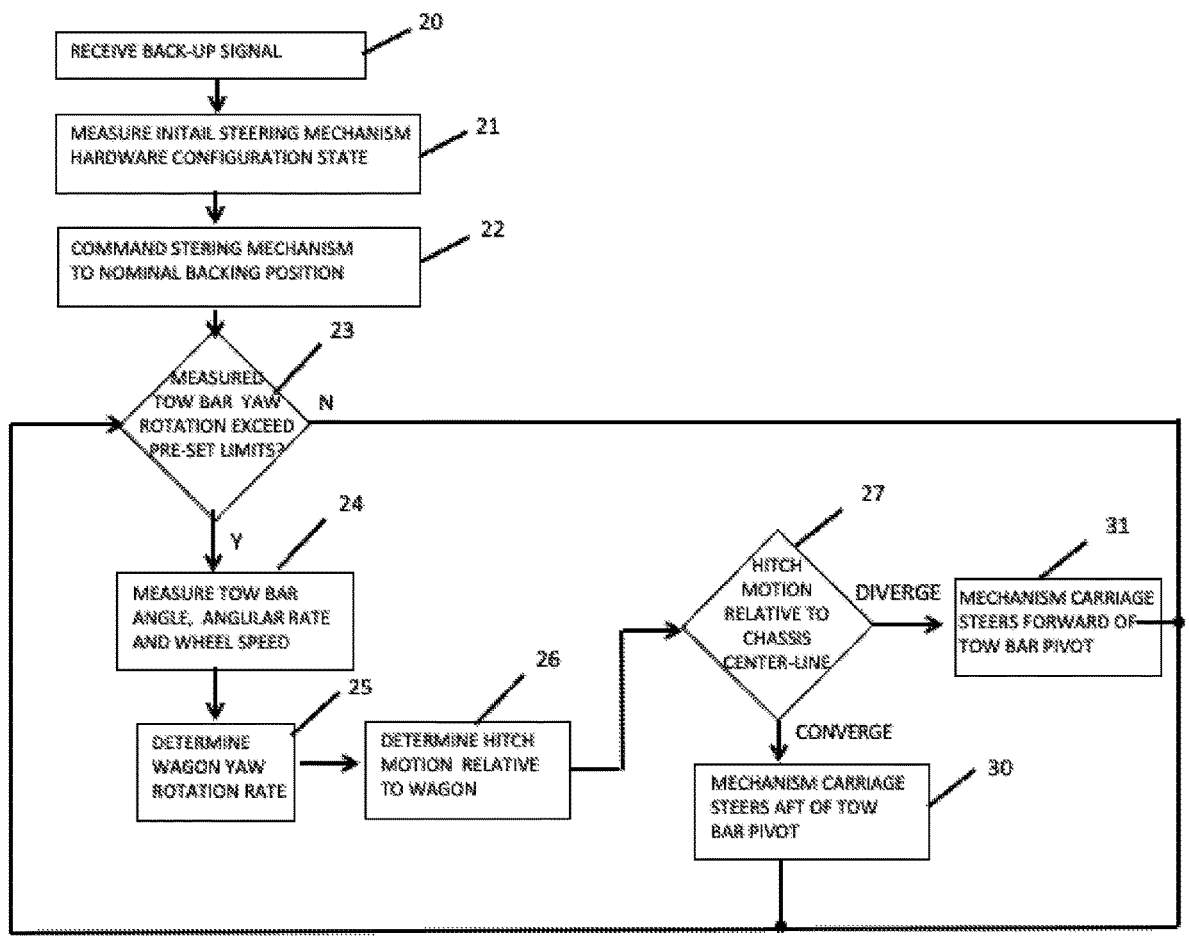
FIG. 11 is a flowchart illustrating a third embodiment of a control system logic for steering a steered-wheel type wagon while backing.

FIG. 11 shows an embodiment of a steering control system for a steered-wheel type wagon for the steering mechanism 12. Steering in the same direction as tow bar 6 is accomplished by driving the carriage 2 forward of the horizontal pivot 5, as shown in block 31, whereas steering opposite of tow bar 6 is accomplished by driving the carriage 2 rearward, or aft of the horizontal pivot 5 as shown in block 30. As the carriage 2 moves further from horizontal pivot 5, the steering response of the control system is increased, as steering leverage is increased relative to the length of the steering arm 4 (FIG. 2).

Figure 12:
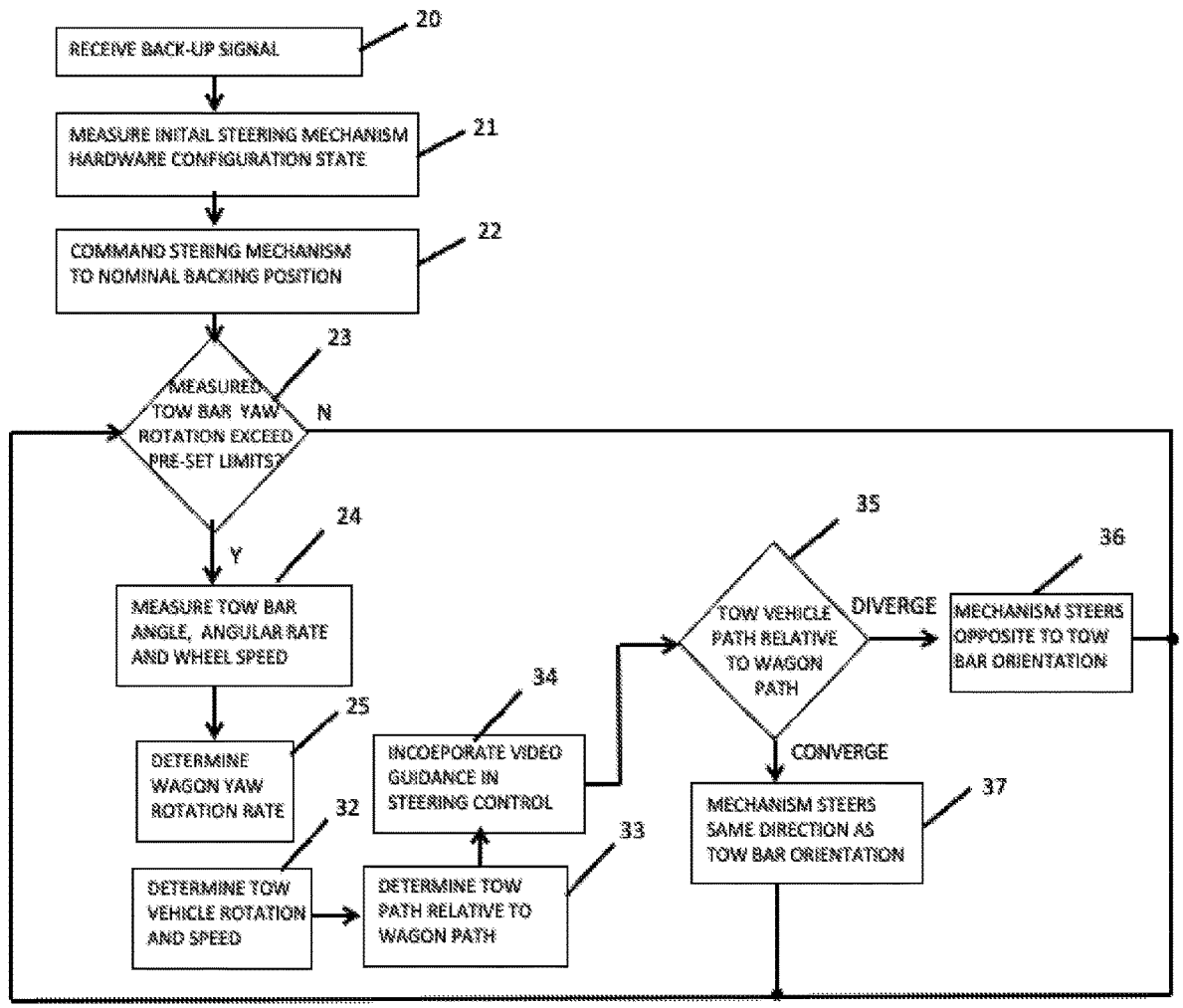
FIG. 12 is a flowchart illustrating a fourth embodiment of a control system logic for steering a steered-wheel type wagon while backing.

FIG. 12 shows an embodiment of a steering control system for a steered-wheel type wagon for the steering mechanism 12. This embodiment of the steering mechanism 12 and control logic comprises automated or semiautomated steering assist technology. For example, video imagery guidance may be used to determine relative road and curb locations and provide further guidance to the steering system control system as shown in block 34. The steering control system 12 may incorporate one or more of forward facing video, optical sensors, and infrared sensors in addition or as an alternative to the sensors already described to determine the orientation of the tow vehicle as shown in block 32 for enabling determination of tow vehicle path as shown in block 33. It is also possible for the sensors to be distributed between the tow vehicle and the trailer or wagon and for the sensor data from each be combined.

The steering system may additionally or alternatively be used with a trailer or wagon that is being towed by trailer or wagon that is itself being towed by a tow vehicle for application in multi-trailer towing applications. For example, a tow dolly for towing a second trailer may be equipped with a steering control system in which the towbar angle sensor is replaced by an optical sensor. In such an embodiment, the optical sensor is positioned to allow a view of the front of the trailer attached to a fifth wheel of the tow dolly. Reference markers may be placed at front corners of the trailer within a field of view of the optical sensor to be used by a microprocessor/microcontroller to calculate an angle of the trailer. In another embodiment, an optical sensor may be located just in front of the fifth wheel with a field of view including an underside of the front of the trailer. A strip of material including reference lines viewable by the optical sensor is positioned underneath the front of the trailer in view of the sensor, for example by magnetic strip or other temporary attachment means. In operation, as the trailer angle changes, the reference lines correspondingly move and are detected by the optical sensor.

Inputs to the microcontroller 9 for controlling the steering mechanism 12 may be signals from a digital encoder 75 representative of carriage 2 position and signals from a digital encoder 77 representative of angle of the towbar 6 with respect to the front axle, or wagon chassis. Encoder 77 may also provide a rate of change, or frequency, signal of the towbar angle with respect to the front axle, as derived from a changing digital bit rate corresponding to how fast the towbar angle is changing. Where the towbar angle is constant, as when backing around an arc with no steering corrections, encoder 77 may indicate towbar angle relative to a straight ahead position of the towbar. When a steering correction is made, the towbar angle will change depending on whether the towbar angle is increasing or decreasing from a centered position and a rate of change of towbar angle will also be provided. The rate of change may be used to determine a speed in driving carriage 2 faster or slower in order to accommodate the new, changing towbar angles. In other embodiments the frequency, or rate of change of towbar angle may not be needed, with a microprocessor calculating where the carriage should be in almost instantaneous increments. By way of example, where encoder 75 reads 360 degrees for each rotation of lead screw 70, then calculations may be made by a microprocessor of the microcontroller 9 in one degree increments of towbar angle so that carriage 2 can be driven a predetermined number of degrees or rotations for each degree of towbar angle as the towbar angle changes. The number of degrees or rotations of the leadscrew per degree of towbar angle may be determined by thread pitch of leadscrew 70. The only requirement of simply calculating carriage position from each degree of changing towbar angle is that motor 58 must be sufficiently fast and powerful to drive the lead screw at a speed sufficient to keep up with changing towbar angles (referred to as phase margin). It has been found that a calculation rate of 30 calculations per second for determining carriage position with respect to towbar angle is well within the range of any anticipated rate of towbar angle change, and well within speed of most microprocessors. 30 calculations per second for carriage position corresponds to a fastest towbar swinging rate, for instance, from a straight ahead position to a 30 degree position, in one second. This would be an extremely fast rate when backing a wagon. Similarly, motors of sufficient capacity to drive leadscrew 70 in order to keep up with the microprocessor calculations, i.e. change of carriage position with towbar angle, exist, the selection of which would be apparent to one of ordinary skill in the art. A slower rate of calculation may be used with a correspondingly slower, less powerful motor, such as a calculation rate of perhaps 15-20 calculations per second corresponding to a rate of towbar change of 15-20 degrees in one second. Likewise, calculations may be made for greater than one degree increments of towbar change, such as a calculation of carriage position for every two or three degrees of towbar angle change, or even every 5 degrees, depending on the pitch of leadscrew 70. From this it should be apparent that the process of constantly adjusting position of carriage 2 with changing towbar angle causes the carriage to be dithered about the nominal or neutral backing position as minor corrections in backing are made in order to cause the tow vehicle and wagon to be backed as though no wagon was attached to the tow vehicle.

The invention claimed is:

1. A steering system for attachment to a towbar of a steered wheel type wagon, said system comprising:
    a bracket comprising:
        a horizontal clevis pin or tube on a front end of the bracket configured for fitting into a clevis of a drawbar and a vertical clevis pin or tube located a distance toward a back end of the bracket configured for fitting into a clevis mounted to a front axle of the wagon; and
    a steering control assembly mounted to the bracket, said steering control assembly comprising:
        a housing enclosing a carriage such that the carriage is movable to positions in front of, a vertical central axis of the vertical clevis pin or tube, said carriage comprising a first opening configured for connection to a first steering tie rod via a knuckle joint; and
        a control actuator mounted to the housing and operationally attached to the carriage to move the carriage forward and backward to positions in front of the vertical central axis of the vertical clevis pin or tube.

2. The steering system of claim 1, wherein the control actuator is an electric motor powered actuator, a manually powered actuator, a hydraulically powered actuator, or a pneumatically powered actuator.

3. The steering system of claim 1, wherein said carriage comprises a second opening configured for connection to a second steering tie rod via a knuckle joint.

4. The steering system of claim 3, wherein the first and second openings on the carriage for connection to first and second steering tie rods are offset such that they are in a same horizontal plane and maintain an Ackerman steering geometry.

5. The steering system of claim 1, wherein the steering control assembly is positioned below the bracket.

6. The steering system of claim 1, further comprising a microprocessor operationally connected to one or more sensors measuring one or more of a drawbar angle with respect to the front axle, a time rate of change of drawbar angle with respect to the front axle, a wagon wheel rotation direction, and a carriage position and wherein the microprocessor is operationally coupled to the control actuator to move the carriage in response to measurements made by the sensor.

7. The steering system of claim 6, further comprising a first limit switch attached at a first end of travel of the carriage and a second limit switch attached at a second end of travel of the carriage and wherein the first and second limit switches are operationally connected to the microprocessor to prevent the movement of the carriage beyond the first and second limit switches.

8. The steering system of claim 1, further comprising a mechanical stop that that can be used to lock the carriage in place.

9. The steering system of claim 1, wherein the control actuator is operationally attached to the carriage to move the carriage forward and backward to positions in front of the vertical central axis of the vertical clevis pin or tube.

10. The steering system of claim 1, wherein the control actuator is operationally attached to the carriage to move the carriage forward and backward to positions even with and in front of the vertical central axis of the vertical clevis pin or tube, as well as in front of the vertical central axis of the vertical clevis pin or tube.

11. A system for improved and/or automated backing of a steered wagon, said system comprising:
the bracket of claim 1, a sensor, and a microprocessor, wherein the sensor measures a towbar angle with respect to the front axle, a time rate of change of towbar angle with respect to the front axle, a wagon wheel rotation direction, or a carriage position, and the microprocessor is operationally coupled to the control actuator to change the position of the carriage in response to measurements made by the sensor.

\* \* \* \* \*